US012580972B2

(12) United States Patent
Xing et al.

(10) Patent No.: US 12,580,972 B2
(45) Date of Patent: Mar. 17, 2026

(54) SHARING A MEDIA ITEM TO A VIDEO CONFERENCE SESSION

(71) Applicant: INTERNATIONAL BUSINESS MACHINES CORPORATION, Armonk, NY (US)

(72) Inventors: Jing Xing, Beijing (CN); Da Li Liu, Beijing (CN); Dan Li, Beijing (CN); Ling Ling Sh Hu, ShangHai (CN); Dong Yan Yang, Beijing (CN); Xi Bo Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/512,102

(22) Filed: Nov. 17, 2023

(65) Prior Publication Data

US 2025/0168208 A1     May 22, 2025

(51) Int. Cl.
*H04L 65/401* (2022.01)
*G06F 3/14* (2006.01)
(Continued)

(52) U.S. Cl.
CPC ........ *H04L 65/4015* (2013.01); *G06F 3/1454* (2013.01)

(58) Field of Classification Search
CPC . H04L 65/4015; H04L 65/403; G06F 3/1454; H04N 7/147; H04N 7/15; G09G 5/14; G09G 2320/0613
See application file for complete search history.

(56) References Cited

U.S. PATENT DOCUMENTS 7,619,645 B2 * 11/2009 Cockerton ............ H04L 65/403
                                                                        348/14.08
8,185,828 B2     5/2012 Liu
                        (Continued)

FOREIGN PATENT DOCUMENTS

CN          101192943 B      2/2011
CN          103597468 A      2/2014
                        (Continued)

OTHER PUBLICATIONS

Disclosed Anonymously, "Methods and apparatus for customised view of a shared screen," An IP.com Prior Art Database Technical Disclosure, IP.com No. IPCOM000229434D, Jul. 30, 2013, 7 pages.
(Continued)

*Primary Examiner* — Kamal M Hossain
(74) *Attorney, Agent, or Firm* — Eric W. Chesley

(57) ABSTRACT
Described are techniques for sharing a media item to a video conference session. The techniques include receiving an instruction to share the media item to one or more other user devices participating in the video conference session. The techniques further include capturing an independent data feed for the media item that is separate from a video conference data feed. The techniques further include sending the independent data feed to the one or more other user devices using a messaging protocol that identifies the independent data feed for the media item as being separate from the video conference data feed. The identifying of the independent data feed as being separate from the video conference data feed enables the one or more other user devices to provide the independent data feed in an application window that is independent of a video conference application window of the video conference session.

20 Claims, 6 Drawing Sheets

(51) Int. Cl.
    *G09G 5/14*           (2006.01)
    *H04L 65/403*       (2022.01)
    *H04N 7/15*          (2006.01)

(56)            References Cited

U.S. PATENT DOCUMENTS

| | | | |
|---|---|---|---|
| 9,407,724 B2 | 8/2016 | Khan | |
| RE46,309 E | 2/2017 | Go et al. | |
| 10,747,418 B2 * | 8/2020 | Pieper | H04L 65/80 |
| 11,196,963 B1 * | 12/2021 | DiPasquale | H04L 65/403 |
| 11,501,264 B1 | 11/2022 | Narayanaswamy | |
| 2012/0011451 A1 | 1/2012 | Bansal et al. | |
| 2012/0089928 A1 | 4/2012 | Bryant | |
| 2012/0110196 A1 | 5/2012 | Balasaygun et al. | |
| 2013/0055113 A1 * | 2/2013 | Chazin | H04L 12/1822 |
| | | | 715/758 |
| 2016/0057391 A1 | 2/2016 | Block et al. | |
| 2018/0341374 A1 | 11/2018 | Faulkner et al. | |
| 2019/0166330 A1 | 5/2019 | Ma et al. | |
| 2020/0371677 A1 | 11/2020 | Faulkner et al. | |
| 2021/0152778 A1 * | 5/2021 | Daggubati | H04N 7/147 |
| 2023/0315262 A1 * | 10/2023 | Surana | G06F 3/0484 |
| | | | 715/204 |

FOREIGN PATENT DOCUMENTS

| | | |
|---|---|---|
| CN | 112631471 A | 1/2023 |
| WO | 2023/129555 A1 | 7/2023 |
| WO | 2014/047935 A1 | 4/2024 |
| WO | 2025/104554 A1 | 5/2025 |

OTHER PUBLICATIONS

"RDP Wrapper Library by Stas'M," https://github.com/stascorp/rdpwrap, printed from the internet Nov. 16, 23, 29 pages.

International Searching Authority, "Notification of Transmittal of the International Search Report and the Written Opinion of the International Searching Authority, or Declaration," Patent Cooperation Treaty, Mar. 14, 2025, 06 pages, International Application No. PCT/IB2024/061020.

International Searching Authority, "Notification of Transmittal of the International Search Report and the Written Opinion of the International Searching Authority, or Declaration," Patent Cooperation Treaty, Jan. 26, 2026, 15 pages, International Application No. PCT/IB2025/060667.

* cited by examiner

100

USER DEVICE (PRESENTER) 130A

VIDEO CONFERENCE CLIENT 102A

TERMINAL 108

MEDIA ITEM 110A

⋮

MEDIA ITEM 110N

ENCODER 112

BITRATE CALCULATOR 114

CODECS 116

ENHANCED MESSAGE PROTOCOL MODULE 118

SHARE MODULE 124

VIDEO CONFERENCE NETWORK 106

USER DEVICE (PARTICIPANT) 130N

VIDEO CONFERENCE CLIENT 102B

DECODER 120

CODECS 116

TERMINAL 108

MEDIA ITEM 110A

⋮

MEDIA ITEM 110N

LAYOUT MODULE 122

STREAMING DATA

STREAMING DATA

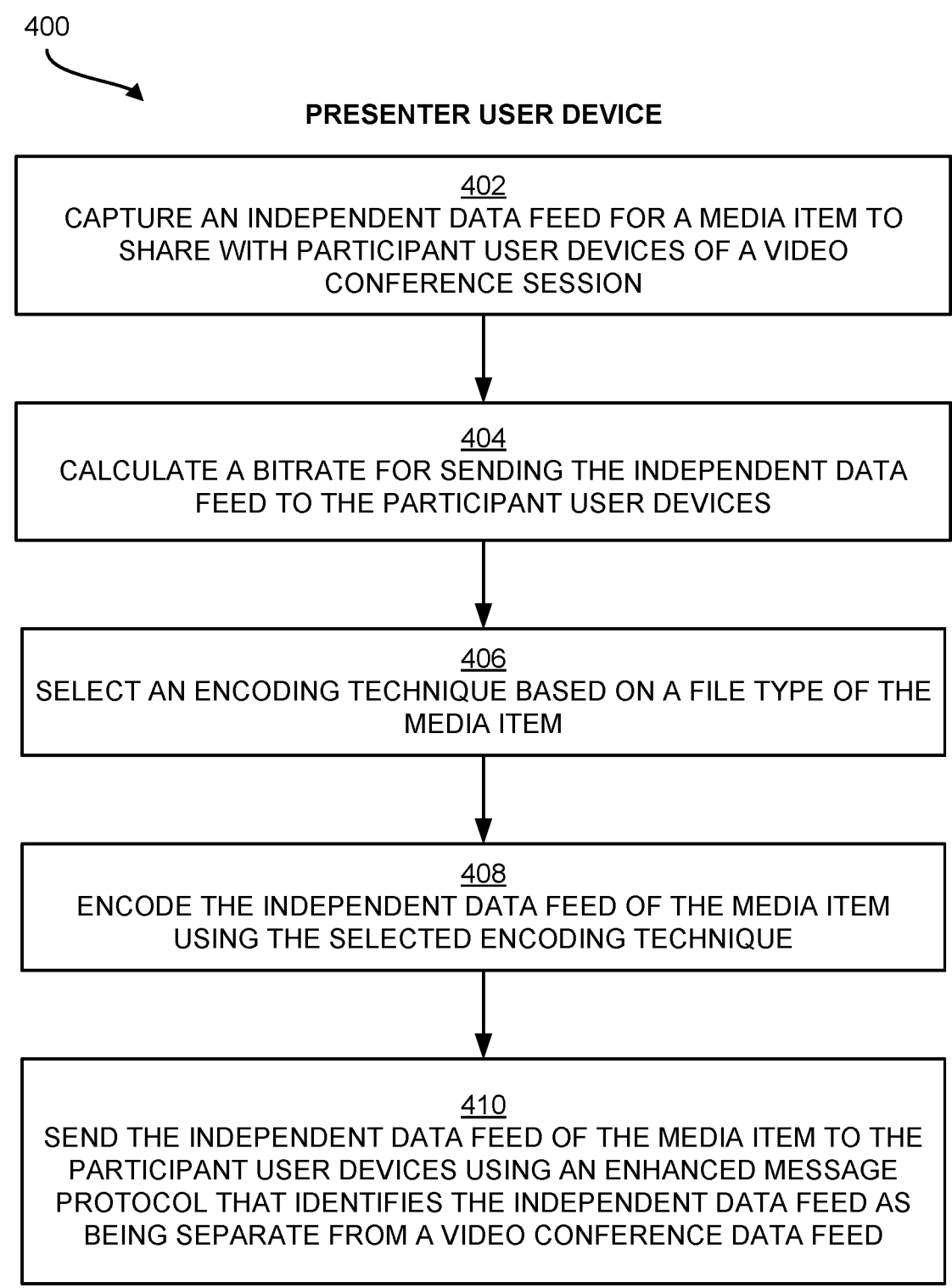

400

PRESENTER USER DEVICE

402
CAPTURE AN INDEPENDENT DATA FEED FOR A MEDIA ITEM TO SHARE WITH PARTICIPANT USER DEVICES OF A VIDEO CONFERENCE SESSION

404
CALCULATE A BITRATE FOR SENDING THE INDEPENDENT DATA FEED TO THE PARTICIPANT USER DEVICES

406
SELECT AN ENCODING TECHNIQUE BASED ON A FILE TYPE OF THE MEDIA ITEM

408
ENCODE THE INDEPENDENT DATA FEED OF THE MEDIA ITEM USING THE SELECTED ENCODING TECHNIQUE

410
SEND THE INDEPENDENT DATA FEED OF THE MEDIA ITEM TO THE PARTICIPANT USER DEVICES USING AN ENHANCED MESSAGE PROTOCOL THAT IDENTIFIES THE INDEPENDENT DATA FEED AS BEING SEPARATE FROM A VIDEO CONFERENCE DATA FEED

FIG. 4

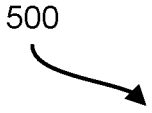

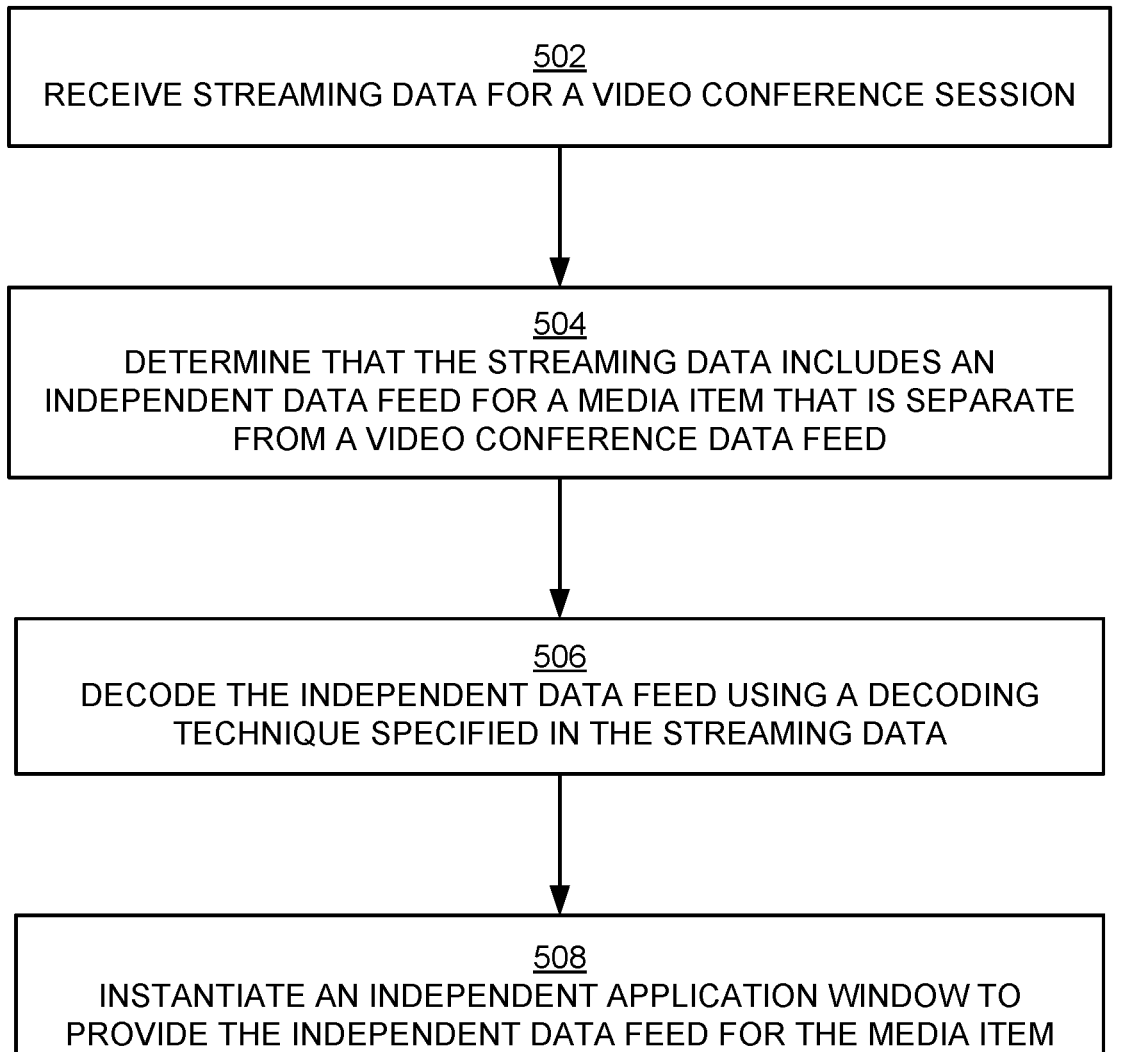

PARTICIPANT USER DEVICE

502
RECEIVE STREAMING DATA FOR A VIDEO CONFERENCE SESSION

504
DETERMINE THAT THE STREAMING DATA INCLUDES AN INDEPENDENT DATA FEED FOR A MEDIA ITEM THAT IS SEPARATE FROM A VIDEO CONFERENCE DATA FEED

506
DECODE THE INDEPENDENT DATA FEED USING A DECODING TECHNIQUE SPECIFIED IN THE STREAMING DATA

508
INSTANTIATE AN INDEPENDENT APPLICATION WINDOW TO PROVIDE THE INDEPENDENT DATA FEED FOR THE MEDIA ITEM

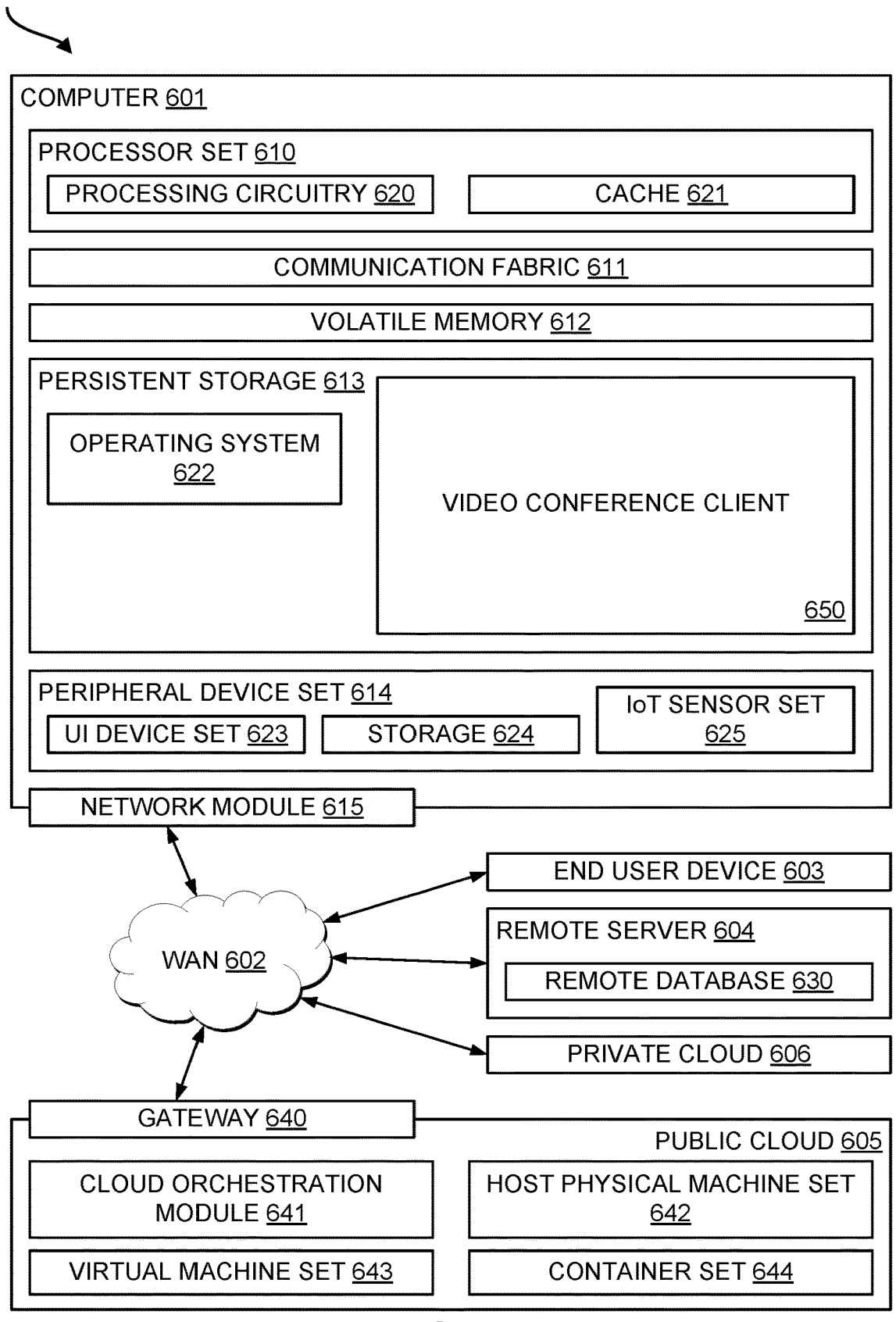

COMPUTER 601

PROCESSOR SET 610

PROCESSING CIRCUITRY 620    CACHE 621

COMMUNICATION FABRIC 611

VOLATILE MEMORY 612

PERSISTENT STORAGE 613

OPERATING SYSTEM 622

VIDEO CONFERENCE CLIENT

650

PERIPHERAL DEVICE SET 614

UI DEVICE SET 623    STORAGE 624    IoT SENSOR SET 625

NETWORK MODULE 615

WAN 602

END USER DEVICE 603

REMOTE SERVER 604

REMOTE DATABASE 630

PRIVATE CLOUD 606

GATEWAY 640

PUBLIC CLOUD 605

CLOUD ORCHESTRATION MODULE 641    HOST PHYSICAL MACHINE SET 642

VIRTUAL MACHINE SET 643    CONTAINER SET 644

FIG. 6

SHARING A MEDIA ITEM TO A VIDEO CONFERENCE SESSION

BACKGROUND

The present disclosure relates to video conference streaming, and, more specifically, to communications protocols for video conference streaming.

Video conferencing is a technology that allows users in different locations to hold real-time face-to-face meetings. Video conferencing works by transmitting audio and/or video between two or more devices over a network, such as the Internet. Video conferencing can be used for various purposes, such as business meetings, educational courses, medical appointments, and social events. Platforms for video conferencing can include features that allow users to share their screens, chat with one another, record video conference sessions, as well as other features.

SUMMARY

Aspects of the present disclosure are directed toward a computer-implemented method comprising receiving an instruction to share a media item to one or more other user devices participating in a video conference session. The computer-implemented method further comprising capturing an independent data feed for the media item that is separate from a video conference data feed. The computer-implemented method further comprising sending the independent data feed for the media item to the one or more other user devices using a messaging protocol that identifies the independent data feed for the media item as being separate from the video conference data feed to enable the one or more other user devices to provide the independent data feed in an application window that is independent of a video conference application window of the video conference session.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 4 is a flow diagram that illustrates an example method for providing an independent data feed of a media item to participants of a video conference session, in accordance with some embodiments of the present disclosure.

FIG. 5 is a flow diagram illustrating an example method for providing an independent application window for a media item on a participant user device of a video conference session, in accordance with some embodiments of the present disclosure.

FIG. 6 is a block diagram that illustrates an example computing environment in which aspects of the present disclosure can be implemented, in accordance with some embodiments of the present disclosure.

Figure 1:
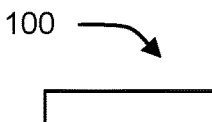
FIG. 1 is a block diagram illustrating an example video conferencing system, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed to sharing a media item to a video conference session using an independent data feed that enables the media item to be provided in an independent application window on participant user devices that is separate from a video conference application window. While not limited to such applications, embodiments of the present disclosure may be better understood in light of the aforementioned context.

Generally, video conferencing technologies allow a presenter to share (display) one or more media items, such as text documents, slideshows, videos, etc. with other participants of the video conference session. For example, a presenter can share a media item by opening the media item on the presenter's user device and selecting a share function of the video conferencing platform that captures the media item and integrates the capture of the media item into a video conference data feed of the video conference shown in a video conference application window of the video conference on the other participant's user devices. However, when received at the participant user devices, prior to the present disclosure, the elements included in the video conference data feed were shown in a fixed layout in a video conference application window (e.g., a fixed configuration of participant video feeds, chat features, and other media items shared by the presenter). Accordingly, the participants of the video conference could not change the layout to better view and/or interact with the shared media item displayed in the video conference application window. For example, the participants could not separate the media item from the video conference application window to better view and/or interact with the media item. Moreover, in cases where multiple media items were shared to the video conference session, a media item with which the presenter was currently interacting with was obscured by the other shared media items.

Advantageously, aspects of the present disclosure overcome these challenges by substantially simultaneously capturing an independent data feed for a media item that is shared to user devices participating in a video conference session to enable the user device to provide the independent data feed in an application window that is separate (autonomous) from a video conference application window. Providing the independent data feed in the application window allows a participant of the video conference session to adjust a position and/or size of the application window separate from the video conference application window.

In some embodiments, a computer-implemented method shares a media item to a video conference session using a messaging protocol that enables participant user devices to provide the media item in an application window that is separate from a video conference application window. Namely, a computer receives an instruction to share a media item to one or more other user devices participating in a video conference session. In response, the computer captures an independent data feed for the media item that is separate from a video conference data feed, and the computer sends the independent data feed for the media item to the one or more other user devices using a messaging protocol that identifies the independent data feed for the media item as being separate from the video conference data feed. The identifying of the independent data feed as being separate from the video conference data feed enables the one or more other user devices to provide the independent data feed in an application window that is independent of a video conference application window of the video conference session. As a result, the computer-implemented method provides the technical effect of enhancing a message protocol to differentiate between a video conference data feed for a video conference session and an independent data feed for a media item shared to user devices participating in the video conference session.

In some embodiments, the computer determines a bitrate and an encoding technique for the independent data feed based on a file type of the media item. As a result, the computer-implemented method provides the technical effect of selecting a bitrate and encoding technique to enable efficient transmission of the independent data feed to the user devices participating in the video conference session. That is, because a bitrate and encoding technique used to transmit the video conference data feed to the user devices participating in the video conference session may not be optimal for transmitting the independent data feed to the user devices, the computer-implemented method allows the selection of a more optimal bitrate and encoding technique for transmitting the independent data feed of the media item.

In some embodiments, the computer comprises a user device that generates the independent data feed for sharing the media item to the one or more other user devices participating in the video conference session. Because the independent data feed is generated locally on the user device sharing the media item, the computer-implemented method provides the technical effect of reducing a workload on a video conference server that would otherwise generate the independent data feed.

In some embodiments, a participant user device of the video conference session receives streaming data for the video conference session, determines that a message included in the streaming data identifies the independent data feed for the media item as separate from the video conference data feed of the video conference session, decodes the independent data feed using a decoding technique indicated in the message, and instantiates an application window to provide the independent data feed on the participant user device. Instantiating the application window allows a user of the participant user device to adjust a size and position of the application window separately from the video conference application window of the video conference session. As a result, the computer-implemented method provides the technical effect of providing an application window for the independent data feed that is independent of the video conference application window, which allows the user to control the size and position of the application window independently from the video conference application window. Providing the application window for the independent data feed is an improvement to a user interface and the user experience because having the ability to adjust the size and position of the application window independently from the video conference application window improves viewability of the shared media item on the user's desktop.

In some embodiments, the computer enhances a real-time messaging protocol (RTMP) message to identify the independent data feed for the media item as being separate from the video conference data feed of the video conference session. As a result, the computer-implemented method provides the technical effect of a multiple data feed (video conference data feed and media item data feed) that is sent in parallel from a presenter user device to one or more participant user devices using enhanced RTMP messages. That is, enhancing the RTMP messages to identify the independent data feed as being separate from the video conference data feed enables sending of the data feeds in parallel.

In some embodiments, the computer further enhances the RTMP message to specify: a stream identifier for the independent data feed of the media item, an encoding technique used to encode the independent data feed of the media item, and layout settings for the application window to be initially used by the one or more other user devices to provide the independent data feed of the media item. As a result, the computer-implemented method provides the technical effect of providing a participant user device information for identifying the independent data feed for the media item in a multiple data feed, and providing the independent data feed in an application window on the participant user device. Namely, the information in the enhanced RTMP message enables the participant user device to differentiate between the independent data feed and the video conference data feed, and to independently decode independent data feed, and to instantiate the application window for the independent data feed using initial layout settings (e.g., an initial size and position), which can thereafter be changed by the user.

In some embodiments, the computer captures a plurality of independent data feeds for a plurality of media items shared to the video conference session, where a message of the messaging protocol sent to the one or more other user devices identifies, separately, the plurality of independent data feeds to enable the one or more other user devices to provide each independent data feed in the plurality of independent data feeds in a separate application window that is independent of the video conference application window of the video conference session. As a result, the computer-implemented method provides the technical effect of providing a separate application window for each media item that is shared to the video conference session, which allows a user to independently adjust the application windows according to the user's preferences.

In some embodiments, the computer adds information to a message of the messaging protocol that identifies an active media item, included in a plurality of media items, that has a most recent focus on the desktop of a user device that is sharing the plurality of media items to other user devices participating in the video conference session. As a result, the computer-implemented method provides the technical effect of notifying participant user devices which of the plurality of media items is the active media item on the presenter's desktop. That is, because each of the plurality of media items is provided a separate application window on the participating user devices, the messaging protocol informs the participating user devices which of the application windows contains the active media item.

In some embodiments, a participant user device of the video conference session receives a message of the messaging protocol and determines that the message identifies the active media item having the most recent focus on the desktop of the user device sharing the plurality of media items. In response, the participant user device displays a visual indication on the participant user device to identify the active media item. As a result, the computer-implemented method provides the technical effect of displaying, to the participants of the video conference session, which of the application windows containing shared media items is the active media item on the presenter's desktop. Displaying the visual indication is an improvement to a user interface and the user experience because it differentiates an application window containing the active media item from other application windows containing inactive media items.

Moreover, in some embodiments, a computer-implemented method comprises a presenter user device of a video conference session that receives an instruction to share a media item to one or more participating user devices of the video conference session. In response, the presenter user device captures an independent data feed for the media item that is separate from a video conference data feed and sends the independent data feed for the media item to the one or more participating user devices using an enhanced RTMP that specifies a stream identifier for the independent data feed of the media item, an encoding technique used to encode the independent data feed of the media item, and layout settings for the application window to be initially used by the one or more other user devices to provide the independent data feed of the media item. The computer-implemented method further comprises one or more participating user devices of the video conference session that receive streaming data for the video conference session and determine that an RTMP message included in the streaming data includes the stream identifier, the encoding technique, and the layout settings for the application window. In response, the one or more participating user devices identify the independent data feed for the media item using the stream identifier indicated in the RTMP message, decode the independent data feed based on the encoding technique indicated in the RTMP message, and instantiate an application window using the layout settings indicated in the RTMP message to provide the independent data feed on the one or more participant user devices, thereby allowing the users of the participant user devices to adjust a size and position of the application window separately from the video conference application window of the video conference session. As a result, the computer-implemented method provides the technical effect of enhancing the RTMP to differentiate between a video conference data feed for a video conference session and an independent data feed for a media item shared to user devices participating in the video conference session, and to include information for providing the independent data feed for the media item in an application window that is separate from a video conference application window used to provide participant video, audio, chat, etc.

Referring now to the figures, FIG. 1 illustrates a block diagram of an example video conferencing system 100 that provides an independent data feed for a shared media item to one or more video conference participants, in accordance with some embodiments of the present disclosure. Video conferencing provides real-time communication to allow two or more participants in different locations to communicate with each other using video and/or audio. As background, participants of a video conference may each utilize a user device (e.g., desktop computer, laptop computer, tablet computer, mobile device, etc.) configured with a camera (e.g., webcam), a microphone, a speaker(s), and a network device (e.g., network interface card (NIC), wireless network module, etc.) to connect to a video conference network. The user device includes video conferencing software that invokes and manages a video conference session. The video conferencing software can use a variety of techniques to compress and transmit audio and video data over the video conference network. Generally, video conference sessions comprise capturing, compressing, and sending participant video and/or audio data (e.g., a video conference data feed) by a user device to a video conference network, where one or more video conferencing servers provide the video and/or audio data to the other participant user devices, which in response to receiving the video and/or audio data, decompress and output the video and/or audio data on the participant user devices via the video conferencing software. However, as described earlier, prior to the present disclosure, media items (e.g., documents, images, videos, etc.) shared by a presenter to the video conference session were displayed in a single video conference application window used to provide the video conference session on the participant user devices, such that the participants of the video conference session were unable to control a layout of an individual media item (e.g., size and position) displayed in the video conference application window on the participants' user devices.

Accordingly, one feature and advantage of some embodiments is the video conferencing system 100 illustrated in FIG. 1, which provides an independent application window for each media item 110A and 110N (collectively 110, where N can refer to any positive integer representing any number of media items) shared to a video conference session. A media item 110 can comprise any type of electronic object capable of being output by a computing device, including documents, images, video, and audio. As shown, the video conferencing system 100 includes video conference clients 102A and 102B (collectively 102) that are hosted on user devices 130A and 130N (where N can refer to any positive integer representing any number of user devices) configured to communicate over a video conference network 106 to allow participants of a video conference session to share and view media items 110. It should be appreciated that, while user devices 130A and 130N are labeled separately for clarity, in practice, user devices 130A and 130N may comprise the same functionality and may frequently switch between presenter and viewer roles.

To provide an understanding of a data flow between a presenter user device 130A and 130N, FIG. 1 illustrates video conference clients 102A and 102B, where video conference client 102A is shown as having a share module 124, an encoder 112, and an enhanced message protocol module 118 for sending data feeds to video conference participants, and video conference client 102B is shown as having a decoder 120 and a layout module 122 for receiving and displaying the data feeds. However, it will be appreciated that an implementation of a video conference client 102 can include the components illustrated in both the video conference clients 102A and 102B to enable the video conference client 102 to function as a presenter and a participant of a video conference session. That is, when implemented, the video conference client 102 can include the share module 124, the encoder 112, the enhanced message protocol module 118, the decoder 120, the layout module 122, and other appropriate components, as will be appreciated.

As shown in FIG. 1, the video conference client 102A captures a data feed for a video conference session from a terminal 108, such as a camera and/or microphone. The video conference client 102A also captures one or more independent data feeds for one or more media items 110 shared to the video conference session. The video conference data feed comprises an ongoing stream of video, image, and/or audio data used to represent a participant of video conference session to other participants of the video conference session. More specifically, the video conference data feed comprises one or more of: real-time video of a participant, real-time audio of the participant, and/or an image used to represent the participant (e.g., a profile picture). An independent data feed for a media item 110 comprises an ongoing data stream of the media item 110 (e.g., video data comprising screenshot captures of the media item 110 and/or audio data of the media item 110). As illustrated and described in greater detail below, the video conference data feed for the video conference and any independent data feeds for media items 110 can be individually provided to an encoder 112, which separately encodes the video conference data feed and the independent data feeds for the media items 110, and the encoded video conference data feed and the independent data feeds are sent to the video conference network 106 using an enhanced message protocol (described in detail below) for distribution to the other video conference clients 102B participating in the video conference session.

The video conference network 106 enables communication between the video conference clients 102. The video conference network 106 can include one or more video conferencing servers and computing networks (not shown), including an intranet, the Internet, a local area network, a wide area network, a wireless data network, or any other such network or combination thereof. Components utilized for the video conference network 106 can depend at least in part upon the type of network and/or environment selected. Communication over the video conference network 106 can be enabled by wired connections, wireless connections, and combinations thereof.

Figure 2:
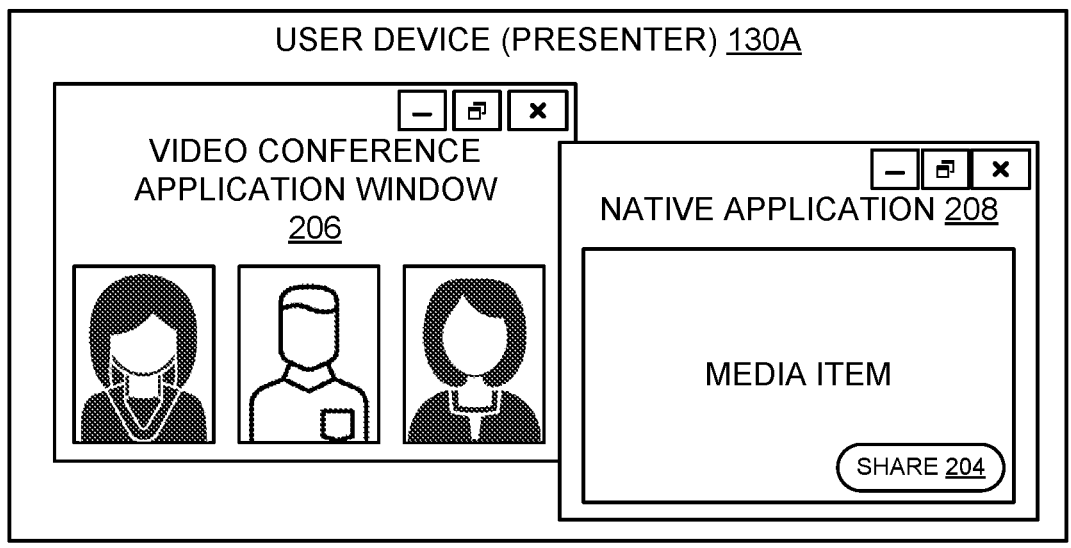
FIG. 2 is a diagram that illustrates sharing of a media item by a presenter user device with one or more participant user devices included in a video conference session, in accordance with some embodiments of the present disclosure.
Figure 2:
Figure 2:
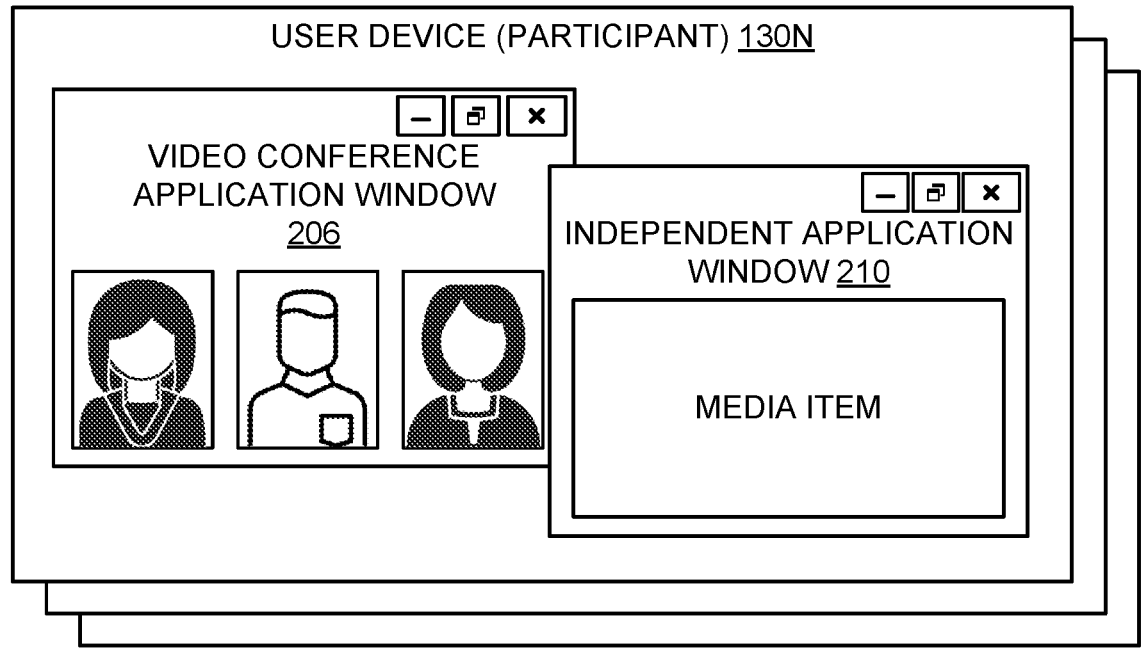

With continuing reference to FIG. 1, FIG. 2 illustrates sharing of a media item 110 by a presenter user device 130A with one or more participant user devices 130N included in a video conference session, in accordance with some embodiments of the present disclosure. The user devices 130A and 130N comprise computing devices configured to host the video conference clients 102 depicted in FIG. 1. A presenter of a media item 110, via user device 130A, opens the media item 110 (e.g., using an appropriate application, such as a native application 208 designed to be used with the media item 110) and selects a share control 204 (e.g., a user interface button) that invokes the operations of the share module 124. The operations performed by the share module 124 can include capturing the media item 110 (e.g., via a series of screenshots) and sending the capture of the media item 110 (e.g., via a video data feed) to one or more participant user devices 130N participating in the video conference session. Illustratively, during a video conference session, a user (presenter) can share a media item 110, such as a slideshow document, with other participants of the video conference session by opening the slideshow document using a native application (e.g., PowerPoint®, Google Slides™, Keynote®, and the like) and selecting the share control 204. In response, the share module 124 captures a series of screenshots of the slideshow document forming an independent data feed and causes the independent data feed of the slideshow document to be sent to the other participant user devices 130N participating in the video conference session.

As shown in FIG. 1, a capture of a media item 110 is provided to an encoder 112, which includes a bitrate calculator 114 to determine an individual bitrate for an independent data feed of the media item 110 (which is in contrast to past methods that utilized one bitrate for a video conference data feed that included shared media items). The bitrate calculator 114 determines a number of bits per second (bps) sufficient for transmitting an independent data feed for a media item 110 to provide a quality representation (e.g., a low amount of distortion or artifacts) of the media item 110 on participant user devices 130N. In some embodiments, the bitrate calculator 114 determines a bitrate based on a file type of a media item 110. For example, file types that require a higher bitrate to provide a quality (or adequate) representation on a user device 130N can be assigned a higher bitrate by the bitrate calculator 114 as compared to a bitrate assigned to file types (e.g., text document, slideshow, spreadsheet, etc.) that can be provided to the user device 130N using a lower bitrate. Because some media items 110 having a file type associated with a lower bitrate (e.g., documents) can contain embedded content (e.g., a video) that requires a higher bitrate for quality playback, the bitrate calculator 114, in some embodiments, evaluates a media item 110 to determine whether the media item 110 contains embedded content (e.g., via inspecting a document for video links) that requires a higher bitrate for quality playback, and the bitrate calculator 114 selects the higher bitrate to enable quality playback of the embedded content on a user device 130N.

In addition to selecting a bitrate for the independent data feed, the encoder 112 selects an encoding technique to generate the independent data feed for the media item 110. In some embodiments, the encoder 112 selects an appropriate encoding technique from a plurality of codecs 116. A codec 116 comprises a device or software that compresses a data feed for streaming to the video conference clients 102B, and decompresses the data feed for playback by the video conference clients 102B. Non-limiting examples of video codecs include H.264, H.265, VP9, and AV1. Non-limiting examples of audio codecs include MP3, AAC, and Opus.

As mentioned earlier, the video conference client 102A includes an enhanced message protocol module 118 for sending individual data feeds associated with a video conference session to the video conference network 106 for distribution to the video conference clients 102B. The individual data feeds include a video conference data feed for the video conference session (e.g., participant video and/or audio, chat messages, etc.) and one or more independent data feeds for one or more media items 110 shared by a presenter to the other participants of the video conference session.

In some embodiments, the enhanced message protocol module 118 modifies a known communications protocol for streaming data over a network to indicate (identify) a video conference data feed for a video conference session, and to indicate (identify) one or more independent data feeds for one or more media items 110 shared to the video conference session. A message generated by the enhanced message protocol module 118 can include information that identifies an independent data feed for a media item 110 and information used by a video conference client 102B to decode and display the independent data feed on a user device 130N. In one example, the message can include: a stream identifier for an independent data feed of a media item 110, an encoding technique (codec) used to encode the independent data feed, layout settings for sizing and positioning an independent application window 210 used to provide the independent data feed on the desktop a user device 130N, and other information as can be appreciated.

In some embodiments, the enhanced message protocol module 118 modifies the RTMP to provide independent data feeds of media items 110 to participant user devices 130N. As background, RTMP is a TCP-based protocol configured to maintain persistent low-latency connections between video conference clients 102. RTMP splits streaming data into fragments to deliver a video stream smoothly and transmit as much information as possible. RTMP data packets sent over a TCP connection between video conference clients 102 contain a header and a body. The body contains the payload (the actual data contained in the message, such as compressed video data or audio data). The header is split into a basic header and a chunk message header. The chunk message basic header encodes a chunk stream ID and a chunk type. The chunk type determines the format of the encoded message header. Information in the basic header includes a stream ID. The chunk message header contains meta-data information, such as the message size (measured in bytes), the timestamp delta, and the message type.

As shown in the non-limiting example below, an RTMP message generated by the enhanced message protocol module 118 can include a chunk stream ID in the basic header field that identifies an independent data feed for a media item 110, and information in the data field that identifies a codec used to encode the chunk data and layout settings (e.g., application window position and size) for displaying the independent data feed on a user device 130N (including, in some embodiments, an active parameter to indicate that the media item 110 is the active media item on the presenter's desktop).

| Basic Header | Message Header | Extended Timestamp | Chunk Data |
|---|---|---|---|
| cs__id: 01 | message__type: 9 | 1689090295322 | win1__video__data |

| Message Type | Payload Length | Timestamp | Stream ID | Data |
|---|---|---|---|---|
| 25 | 140 | 1689090295322 | sid1 | win__id: win1(sid1) position: (300, 400) size: 500*500 codec: H.265 active: True |

As shown in the non-limiting example below, in the case where multiple (e.g., three) media items 110 are shared to a video conference session, the enhanced message protocol module 118 generates information for each media item 110 sent to the video conference network 106 for distribution to participant user devices 130N.

| Basic Header | Message Header | Extended Timestamp | Chunk Data |
|---|---|---|---|
| cs__id: 01 | message__type: 9 | 1689090295322 | win1__video__data |
| cs__id: 02 | message__type: 9 | 1689090295322 | win2__video__data |
| cs__id: 03 | message__type: 9 | 1689090295322 | win3__video__data |

-continued

| Basic Header | Message Header | Extended Timestamp | Chunk Data |
|---|---|---|---|
| cs__id: 01 | message__type: 9 | 1689090295344 | win1__video__data |
| cs__id: 02 | message__type: 9 | 1689090295344 | win2__video__data |
| cs__id: 03 | message__type: 9 | 1689090295344 | win3__video__data |

In response to receiving an enhanced message (e.g., an enhanced RTMP message) at a participant user device 130N, the enhanced message is provided to a video conference client 102B hosed on the user device 130N. The video conference client 102B processes the enhanced message to determine whether video streaming data for the video conference session includes an independent data feed for a media item 110. As shown in FIG. 1, the video conference client 102B includes a decoder 120 for decoding a video conference data feed for a video conference session and one or more independent data feeds for one or more media items 110 shared to the video conference session. As described earlier, a message for an independent data feed of a media item 110 contains information that can include: a stream identifier for the independent data feed, an encoding technique (codec) used to encode the independent data feed, layout settings for an independent application window 210 to be used to provide the independent data feed on the user device 130N, and any other needed information, as will be appreciated. The video conference client 102B extracts the encoding technique information from the message, and the decoder uses the encoding technique information to select a codec 116 for decoding the independent data feed of the media item 110. In addition, the video conference client 102B extracts the layout settings for the independent application window 210 from the message, and the layout module 122 uses the layout settings to instantiate the independent application window 210 on the user device 130N.

As shown in FIG. 2, the independent application window 210 used to provide the independent data feed of the media item 110 is an autonomous application window. As such, a user of the user device 130N has the ability to modify the size and position of the independent application window 210 according to the user's preferences, including making the independent application window 210 the foreground window on the user's desktop. For example, in cases where multiple media items 110 are shared to the video conference session, the user can make the independent application window 210 the foreground window on the user's desktop to allow the user to fully view the media item 110.

Figure 3:
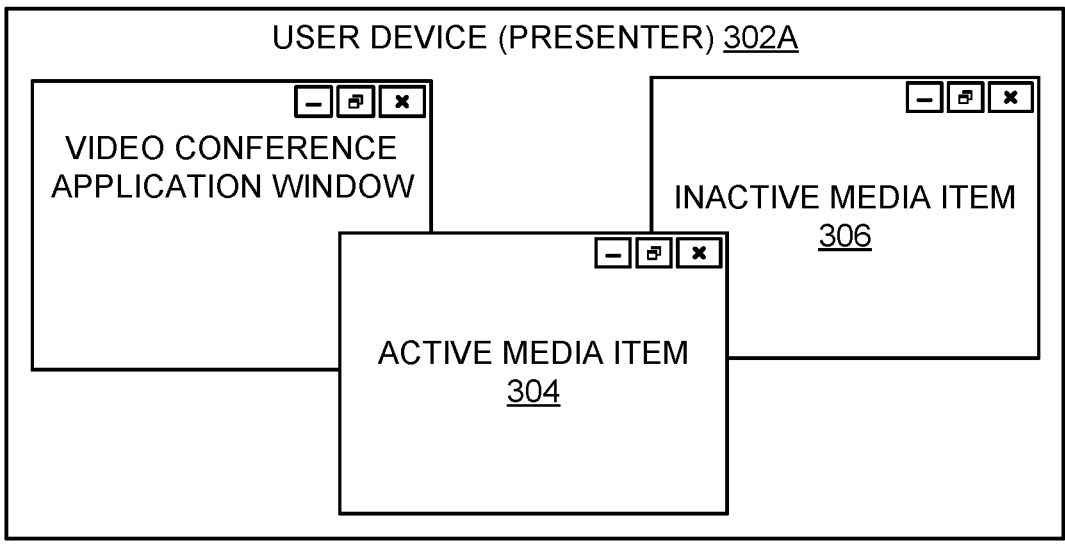
FIG. 3 is a diagram illustrating a visual indication shown on a participant user device to indicate which of a plurality of media items is an active media item on a presenter's user device, in accordance with some embodiments of the present disclosure.
Figure 3:
Figure 3:
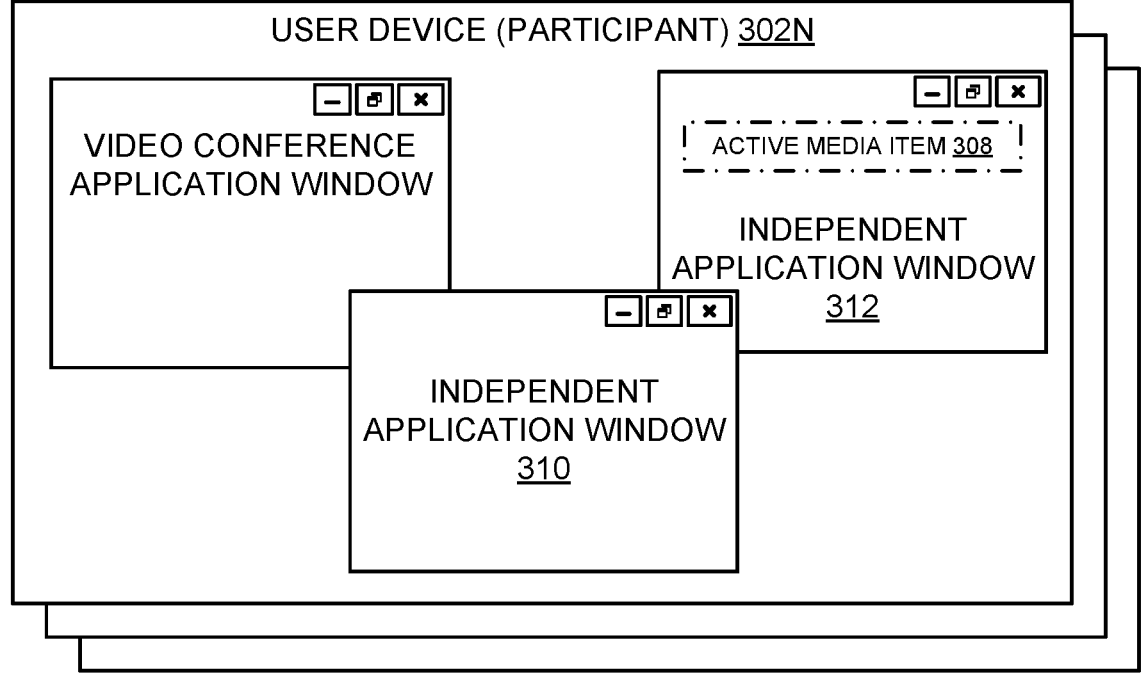

With continuing reference to FIG. 1, FIG. 3 illustrates an example visual indication shown on a participant user device 302N (where N can refer to any positive integer representing any number of user devices) to indicate which of a plurality of media items 304/306 is an active media item 304 on a presenter's user device, in accordance with some embodiments of the present disclosure. An active media item 304 refers to a media item (e.g., document, image, slideshow, video, etc.) open on a presenter's desktop with which a presenter has most recently interacted. As mentioned earlier, in some embodiments, messages for an independent data feed of a media item 304/306 can include an active parameter to indicate which media item 304/306 open on a presenter's desktop is the active media item 304 on the presenter's desktop. In such embodiments, the video conference client 102A determines which of a plurality of media items 304/306 is the active media item 304, and the video conference client 102A sets the active parameter in the messages for the independent data feed of the media item to indicate that the data feed is associated with the active media item 304 on the presenter's desktop.

Determining which of a plurality of shared media items 304/306 is the active media item 304 can comprise: identifying an application window for a shared media item on the presenter's desktop that has the focus on the presenter's desktop (e.g., such as when the presenter sets the application window as the foreground window on the presenter's desktop); identifying an application window on the presenter's desktop that contains a shared media item and is receiving some type of user input (e.g., such as when the presenter hovers a cursor over the media item); and/or identifying an application window containing a shared media item that was last interacted with by the presenter (i.e., the last shared media item with which the presenter interacted).

After determining which of the shared media items 304/306 is the active media item 304 on the presenter's desktop, the video conference client 102A generates an enhanced message for the independent data feed of the active media item 304 to indicate that the independent data feed is associated with the active media item 304. When the messages for the independent data feed are received at a participant user device 302N, the video conference client 102B evaluates the active parameter to identify the active media item 304, and the video conference client 102B causes a visual indication 308 (e.g., a label, banner, animation, color, or the like) to be displayed on the participant user device 302N that identifies the independent application window 312 as containing the active media item 304. In the event that another media item becomes the active media item 304 on the presenter's desktop (e.g., the presenter opens or selects a different document, image, slideshow, video, or the like), the video conference client 102A updates the messages for the respective independent data feeds accordingly, which when received by the video conference client 102B, causes the video conference client 102B to update the display of the visual indication 308 to be associated with the independent application window that displays the active media item 304 on the participant user device 302N.

All or a portion of the components shown in FIGS. 1-3 can be implemented, for example by all or a subset of the computing environment 600 of FIG. 6. A video conference client 102 can be implemented in software, hardware, firmware or a combination thereof. When software is used, the operations performed by a video conference client 102 can be implemented in program instructions configured to run on hardware, such as a processor unit. When firmware is used, the operations performed by a video conference client 102 can be implemented in program instructions and data and stored in persistent memory to run on a processor unit. When hardware is employed, the hardware can include circuits that operate to perform the operations in a video conference client 102. The hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Generally, the components illustrated include routines, programs, components and/or data structures that perform particular tasks and/or implement particular abstract data types. In some embodiments, the components can be implemented as computing services hosted in a computing service environment. For example, a module can be considered a service with one or more processes executing on a server or other computer hardware. Such services can provide a service application that receives requests and provides output to other services or consumer devices. An API can be provided for each module to enable a first module to send requests to and receive output from a second module. Such APIs can also allow third parties to interface with the module and make requests and receive output from the modules.

While the figures described above illustrate examples of a computational environment that can implement the techniques above, many other similar or different environments are possible. The example environments discussed and illustrated above are merely representative and not limiting. Other components in addition to, or in place of, the ones illustrated may be used. Some components may be unnecessary. Also, the blocks are presented to illustrate some functional components. One or more of these blocks may be combined, divided, or combined and divided into different blocks when implemented in an illustrative embodiment.

FIG. 4 is a flow diagram that illustrates an example method 400 for providing an independent data feed of a media item to participants of a video conference session, in accordance with some embodiments of the present disclosure. As described earlier, a participant of a video conference session can share one or more media items, such as documents, images, and video, with other participants of the video conference session. For example, a presenter can open a media item using an appropriate application designed to be used with the media item and select a share feature which, among other things, shares the media item with other participants of the video conference session. The method 400 illustrated in FIG. 4 and described below is from the perspective of the presenter's user device which, via the operations of the method 400, shares the media item with the other participants of a video conference session.

In operation 402, the method 400 captures an independent data feed for a media item to share with user devices participating in a video conference session. The method 400, in some embodiments, captures the independent data feed in response to receiving an instruction to share the media item to one or more other user devices participating in the video conference session. Capturing the independent data feed can comprise generating a series of screenshots of the media item displayed on the presenter's desktop and generating video data from the screenshots that can be shared with the participating user devices. As will be appreciated, other techniques for capturing the independent data feed are within the scope of the present disclosure.

In operation 404, the method 400 calculates a bitrate for sending the independent data feed to the participant user devices. In some embodiments, the method 400 calculates the bitrate based on a file type of the media item, such that the method 400 selects a higher bitrate for file types (e.g., videos) that require a higher bitrate to provide a quality representation on a user device, and the method 400 selects a lower bitrate for file types (e.g., images) that do not require a high bitrate to provide a quality representation on a user device. In some embodiments, the method 400 evaluates a media item to determine whether the media item contains embedded content that requires a higher bitrate for quality playback on a user device, and the method 400 selects a higher bitrate to enable quality playback of the embedded content on the participant user devices.

In operation 406, the method 400 selects an encoding technique for the independent data feed based on a file type of the media item. For example, the method 400 can select an appropriate codec to compress the independent data feed for streaming to the user devices participating in the video conference session. Non-limiting examples of codecs include H.264, H.265, VP9, AV1, MP3, AAC, and Opus. In operation 408, the method 400 encodes the independent data feed using the selected encoding technique.

In operation 410, the method 400 sends the independent data feed of the media item to the user devices participating in the video conference session to enable the participating user devices to provide the independent data feed in an independent application window that is separate from a video conference application window of the video conference session. The method 400 uses an enhanced message protocol to send the independent data feed to the user devices. The enhanced message protocol identifies the independent data feed as being separate from a video conference data feed of the video conference session, which allows the independent data feed to be provided in an independent application window on participating user devices that is separate (autonomous) from the video conference application window of the video conference session. In some embodiments, the enhanced message protocol comprises the real-time message protocol (RTMP).

The method 400, in some embodiments, enhances the message protocol to include a stream identifier for the independent data feed of the media item, an encoding technique (e.g., codec) used to encode the independent data feed of the media item, layout settings (e.g., position and size) for an independent application window for the media item, as well as other information for providing the media item on the participating user devices. Also, in some embodiments, the method 400 enhances the message protocol to identify an active media item included in multiple media items on a presenter's desktop. The active media item comprises one of multiple media items open on the presenter's desktop with which the presenter is currently, or most recently, referencing. Identification of which media item open on the presenter's desktop is the active media item can be used to identify (highlight) an open independent application window on the participant's desktop that contains the active media item. Illustratively, the method 400 can determine which of the media items open on the presenter's desktop is the active media item by determining which application window containing a media item open on the presenter's desktop has the focus (e.g., is the foreground application window on the presenter's desktop), or is receiving some type of user input (e.g., such as when the presenter hovers a cursor over the media item), or was the last media item interacted with by the presenter.

FIG. 5 is a flow diagram illustrating an example method 500 for providing a media item shared to participants of a video conference session in an independent application window on a participating user device, in accordance with some embodiments of the present disclosure. As described above in association with FIG. 4, a media item shared by a presenter with participants of a video conference session is sent to participating user devices using an enhanced message protocol that identifies an independent data feed of the media item as being separate from a video conference data feed of the video conference session. The method 500 illustrated in FIG. 5 and described below is from the perspective of a participant's user device that receives the independent data feed of the media item via the enhanced message protocol.

In operation 502, the method 500 receives streaming data for a video conference session. In response to receiving the streaming data, the method 500, in operation 504, determines that the streaming data includes an independent data feed for a shared media item that is separate from a video conference data feed for the video conference session. For example, the method 500 processes (analyzes) messages included in the streaming data to determine whether the messages contain information for a media item shared by a presenter user device. In some embodiments, the messages comprise RTMP messages. As described earlier, the messages are enhanced to include, for example, a stream identifier for an independent data feed of a media item, an encoding technique (e.g., codec) used to encode the independent data feed, layout settings (e.g., position and size) for an independent application window for the media item, and other information as will be appreciated.

In operation 506, the method 500 decodes the independent data feed for the media item using a decoding technique specified in the streaming data. The enhanced messages included in the independent data feed of the media item specify a codec used to encode the independent data feed. The method 500 processes the messages to identify the codec, and the method 500 decodes the independent data feed using the codec. Because the independent data feed for the media item is separate from the video conference data feed for the video conference session, the codec used to encode and decode the independent data feed may be different than a codec used to encode and decode the video conference data feed for the video conference session.

In operation 508, the method 500 instantiates an independent application window used to provide the independent data feed for the media item on the participating user device. The independent application window for the media item is separate from a video conference application window used to provide a user interface for the video conference session. As such, participants of the video conference session have the ability to reposition and resize the independent application window according to the participants' preferences, as well as make the independent application window the foreground window on the participants' user devices. Illustratively, when multiple media items are shared to the video conference session, a participant can modify the layout (size and position) of independent application windows on the participant's desktop to enable viewing of a selected media item of interest to the participant.

In some embodiments, the method 500 instantiates the independent application window using layout setting specified in the messages associated with the independent data feed of the media item. The method 500 processes the messages to identify the layout settings for an independent application window, and the method 500 uses the layout settings to instantiate the independent application window on the desktop of a participant's user devices.

The methods illustrated and described above can be performed by a computer (e.g., computer 601 in FIG. 6), performed in a cloud environment (e.g., clouds 606 or 605 in FIG. 6), and/or generally can be implemented in fixed-functionality hardware, configurable logic, logic instructions, etc., or any combination thereof.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the disclosed methods, such as block 650 containing computer code for the video conference client described earlier. In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 621 and the other storage media discussed below. The computer readable program instructions, and associated data, are accessed by processor set 610 to control and direct performance of the disclosed methods. In computing environment 600, at least some of the instructions for performing the disclosed methods may be stored in block 650 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid-state storage devices. Operating system 622 may take several forms, such as various known proprietary operating systems or open-source Portable Operating System Interface type operating systems that employ a kernel. The code included in block 650 typically includes at least some of the computer code involved in performing the disclosed methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the disclosed methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a user device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. The terms "comprises," "comprising," "includes," "including," "has," "having," "contains" or "containing," or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. The term "user" refers to an entity (e.g., an individual(s), a computer, or an application executing on a computer). It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure. Note further that numerous aspects or features are disclosed herein, and unless inconsistent, each disclosed aspect or feature is combinable with any other disclosed aspect or feature as desired for a particular application of the concepts disclosed.

As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art. Any advantages discussed in the present disclosure are example advantages, and embodiments of the present disclosure can exist that realize all, some, or none of any of the discussed advantages while remaining within the spirit and scope of the present disclosure.

It will be further appreciated that various aspects of the present invention may be provided in the form of a service deployed on behalf of a customer to offer service on demand.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the various aspects described, the practical application or technical improvement over technologies found in the marketplace, or to enable others of ordinary skill in the art to understand the approaches disclosed herein.

What is claimed is:

1. A computer-implemented method comprising:

receiving an instruction to share a media item to one or more participant user devices participating in a video conference session, wherein the media item is one of a plurality of media items for sharing by a presenter user device to the one or more participant user devices participating in the video conference session;

capturing an independent data feed for the media item that is separate from a video conference data feed; and sending the independent data feed for the media item to the one or more participant user devices using a messaging protocol that includes:

a parameter that identifies the independent data feed for the media item as being separate from the video conference data feed to enable a participant user device to separate the independent data feed for the media item from the video conference data feed and provide the independent data feed in an application window instantiated by the participant user device, such that the application window is independent of a video conference application window of the video conference session; and an active parameter that identifies the media item in the independent data feed as an active media item on the presenter user device among the plurality of media items for sharing by the presenter user device, where the active parameter instructs the participant user device to modify the application window to display a visual indication to show that the application window contains the active media item, thereby differentiating an appearance of the application window from other application windows on the participant user device containing other media items shared by the presenter user device.

2. The computer-implemented method of claim 1, wherein capturing the independent data feed for the media item further comprises determining a bitrate and an encoding technique for the independent data feed based on a file type of the media item.

3. The computer-implemented method of claim 1, wherein the independent data feed is generated at a user device that is sharing the media item to the one or more participant user devices participating in the video conference session.

4. The computer-implemented method of claim 1, further comprising:

receiving, at a participant user device of the video conference session, streaming data for the video conference session;

determining that a message included in the streaming data identifies the independent data feed for the media item as separate from the video conference data feed of the video conference session;

decoding the independent data feed using a decoding technique indicated in the message, and instantiating the application window to provide the independent data feed on the participant user device, which allows a user of the participant user device to adjust a size and position of the application window separately from the video conference application window of the video conference session.

5. The computer-implemented method of claim 1, wherein sending the independent data feed for the media item to the one or more participant user devices using the messaging protocol further comprises:

modifying a real-time messaging protocol (RTMP) message to identify the independent data feed for the media item as being separate from the video conference data feed of the video conference session.

6. The computer-implemented method of claim 5, wherein modifying the RTMP message further comprises:

specifying: a stream identifier for the independent data feed of the media item, an encoding technique used to encode the independent data feed of the media item, and layout settings for the application window to initially be used by the one or more participant user devices to provide the independent data feed of the media item.

7. The computer-implemented method of claim 1, wherein capturing the independent data feed for the media item further comprises:

capturing a plurality of independent data feeds for the plurality of media items shared to the video conference session, wherein a message of the messaging protocol sent to the one or more participant user devices includes parameters separately identifying the plurality of independent data feeds to enable the one or more participant user devices to provide each independent data feed in the plurality of independent data feeds in a separate application window that is independent of the video conference application window of the video conference session.

8. The computer-implemented method of claim 1, wherein the active parameter further identifies the active media item as having a most recent focus on a desktop of the presenter user device.

9. The computer-implemented method of claim 1, further comprising:

receiving, at a participant user device of the video conference session, a message of the messaging protocol;

determining that the active parameter in the message identifies the active media item; and displaying the visual indication on the participant user device to identify the active media item.

10. A system comprising:

one or more computer readable storage media storing program instructions and one or more processors which, in response to executing the program instructions, are configured to:

receive an instruction to share a media item to one or more participant user devices participating in a video conference session, wherein the media item is one of a plurality of media items for sharing by a presenter user device to the one or more participant user devices participating in the video conference session;

capture an independent data feed for the media item that is separate from a video conference data feed; and send the independent data feed for the media item to the one or more participant user devices using a messaging protocol that includes:

a parameter that identifies the independent data feed for the media item as being separate from the video conference data feed to enable a participant user device to separate the independent data feed for the media item from the video conference data feed and provide the independent data feed in an application window instantiated by the participant user device, such that the application window is independent of a video conference application window of the video conference session; and an active parameter that identifies the media item in the independent data feed as an active media item on the presenter user device among the plurality of media items for sharing by the presenter user device, where the active parameter instructs the participant user device to modify the application window to display a visual indication to show that the application window contains the active media item, thereby differentiating an appearance of the application window from other application windows on the participant user device containing other media items shared by the presenter user device.

11. The system of claim 10, wherein the program instructions configured to cause the one or more processors to capture the independent data feed for the media item are further configured to cause the one or more processors to:

determine, by a user device that is sharing the media item to the one or more participant user devices participating in the video conference session, a bitrate and an encoding technique for the independent data feed based on a file type of the media item.

12. The system of claim 10, wherein the program instructions are further configured to cause the one or more processors to:

receive, at a participant user device of the video conference session, streaming data for the video conference session;

determine that a message included in the streaming data identifies the independent data feed for the media item as separate from the video conference data feed of the video conference session;

decode the independent data feed using a decoding technique indicated in the message, and instantiate the application window to provide the independent data feed on the participant user device, which allows a user of the participant user device to adjust a size and position of the application window separately from the video conference application window of the video conference session.

13. The system of claim 10, wherein the program instructions configured to cause the one or more processors to send the independent data feed for the media item to the one or more participant user devices using the messaging protocol are further configured to cause the one or more processors to:

enhance a real-time messaging protocol (RTMP) message to specify: a stream identifier for the independent data feed of the media item, an encoding technique used to encode the independent data feed of the media item, and layout settings for the application window to be initially used by the one or more participant user devices to provide the independent data feed of the media item.

14. The system of claim 10, wherein the program instructions configured to cause the one or more processors to capture the independent data feed for the media item are further configured to cause the one or more processors to:

capture a plurality of independent data feeds for the plurality of media items shared to the video conference session, wherein a message of the messaging protocol sent to the one or more participant user devices includes parameters separately identifying the plurality of independent data feeds to enable the one or more participant user devices to provide each independent data feed in the plurality of independent data feeds in a separate application window that is independent of the video conference application window of the video conference session.

15. The system of claim 10, wherein the program instructions are further configured to cause the one or more processors to:

receive, at a participant user device of the video conference session, a message of the messaging protocol;

determine that the active parameter of the message identifies the active media item as having a most recent focus on a desktop of the presenter user device; and display the visual indication on the participant user device that identifies the active media item.

16. A computer program product comprising:

one or more computer readable storage media, and program instructions collectively stored on the one or more computer readable storage media, the program instructions configured to cause one or more processors to:

receive an instruction to share a media item to one or more participant user devices participating in a video conference session, wherein the media item is one of a plurality of media items for sharing by a presenter user device to the one or more participant user devices participating in the video conference session;

capture an independent data feed for the media item that is separate from a video conference data feed; and send the independent data feed for the media item to the one or more participant user devices using a messaging protocol that includes:

a parameter that identifies the independent data feed for the media item as being separate from the video conference data feed to enable a participant user device to separate the independent data feed for the media item from the video conference data feed and provide the independent data feed in an application window instantiated by the participant user device, such that the application window is independent of a video conference application window of the video conference session; and an active parameter that identifies the media item in the independent data feed as an active media item on the presenter user device among the plurality of media items for sharing by the presenter user device, where the active parameter instructs the participant user device to modify the application window to display a visual indication to show that the application window contains the active media item, thereby differentiating an appearance of the application window from other application windows on the participant user device containing other media items shared by the presenter user device.

17. The computer program product of claim 16, wherein the program instructions configured to cause the one or more processors to capture the independent data feed for the media item are further configured to cause the one or more processors to:

determine, by a user device that is sharing the media item to the one or more participant user devices participating in the video conference session, a bitrate and an encoding technique for the independent data feed based on a file type of the media item.

18. The computer program product of claim 16, wherein the program instructions are further configured to cause the one or more processors to:

receive, at a participant user device of the video conference session, streaming data for the video conference session;

determine that a message included in the streaming data identifies the independent data feed for the media item as separate from the video conference data feed of the video conference session;

decode the independent data feed using a decoding technique indicated in the message, and instantiate the application window to provide the independent data feed on the participant user device, which allows a user of the participant user device to adjust a size and position of the application window separately from the video conference application window of the video conference session.

19. The computer program product of claim 16, wherein the program instructions configured to cause the one or more processors to send the independent data feed for the media item to the one or more participant user devices using the messaging protocol are further configured to cause the one or more processors to:

enhance a real-time messaging protocol (RTMP) message to specify: a stream identifier for the independent data feed of the media item, an encoding technique used to encode the independent data feed of the media item, and layout settings for the application window to be initially used by the one or more participant user devices to provide the independent data feed of the media item.

20. The computer program product of claim 16, wherein the program instructions configured to cause the one or more processors to capture the independent data feed for the media item are further configured to cause the one or more processors to:

capture a plurality of independent data feeds for the plurality of media items shared to the video conference session, wherein a message of the messaging protocol sent to the one or more participant user devices includes parameters separately identifying the plurality of independent data feeds to enable the one or more participant user devices to provide each independent data feed in the plurality of independent data feeds in a separate application window that is independent of the video conference application window of the video conference session, and the active parameter identifies the active media item included in the plurality of media items as having a most recent focus on a desktop of the presenter user device.

* * * * *